US011323480B2

(12) United States Patent
Erickson et al.

(10) Patent No.: US 11,323,480 B2
(45) Date of Patent: May 3, 2022

(54) POLICY ENFORCEMENT AND INTROSPECTION ON AN AUTHENTICATION SYSTEM

(71) Applicant: Cisco Technology, Inc., San Jose, CA (US)

(72) Inventors: Jeremy Lee Erickson, Ann Arbor, MI (US); Nicholas Hamilton Steele, Ann Arbor, MI (US); Nicholas James Mooney, Ann Arbor, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 343 days.

(21) Appl. No.: 16/405,308

(22) Filed: May 7, 2019

(65) Prior Publication Data
US 2020/0358822 A1 Nov. 12, 2020

(51) Int. Cl.
H04L 29/06 (2006.01)
(52) U.S. Cl.
CPC .......... H04L 63/20 (2013.01); H04L 63/0823 (2013.01); H04L 63/0884 (2013.01); H04L 63/123 (2013.01)
(58) Field of Classification Search
CPC . H04L 63/20; H04L 63/0823; H04L 63/0884; H04L 63/123
See application file for complete search history.

(56) References Cited

U.S. PATENT DOCUMENTS

| 7,739,744 B2 | 6/2010 | Burch et al. |
| 8,095,972 B1 | 1/2012 | Floyd et al. |
| 8,763,071 B2 | 6/2014 | Sinha et al. |
| 9,020,149 B1 * | 4/2015 | Golwalkar ............... H04L 9/14 380/255 |
| 9,077,714 B2 | 7/2015 | Neuman et al. |
| 9,355,223 B2 | 5/2016 | Qureshi |
| 9,461,982 B2 | 10/2016 | Rajagopal et al. |

(Continued)

OTHER PUBLICATIONS

Moritz Horsch et al., PAsswordLess PAssword Synchronization, Oct. 19, 2015, IEEE, pp. 30-39. (Year: 2015).*

(Continued)

Primary Examiner — Jahangir Kabir
Assistant Examiner — Fahimeh Mohammadi
(74) Attorney, Agent, or Firm — Edell, Shapiro & Finnan, LLC

(57) ABSTRACT

An authentication system handles authentication requests to apply introspection and policy enforcement. A policy server obtains a client security policy and an authenticator security policy. The policy server obtains an encrypted credential request with client metadata from a client and determines whether the client metadata satisfies the client security policy. The policy server provides the encrypted credential request to an authenticator device and obtains an encrypted credential response with authenticator metadata in response. The policy server determines whether the authenticator metadata satisfies the authenticator security policy. The policy server processes the encrypted credential response, without decrypting the encrypted credential request or the encrypted credential response, based on a determination of whether the client metadata satisfies the client security policy and the authenticator metadata satisfies the authenticator security policy.

17 Claims, 5 Drawing Sheets

(56) References Cited

U.S. PATENT DOCUMENTS

| | | | |
|---|---|---|---|
| 9,935,937 B1* | 4/2018 | Potlapally | H04L 63/0853 |
| 10,911,428 B1* | 2/2021 | Roth | H04L 63/10 |
| 10,972,580 B1* | 4/2021 | Dorn | G06F 9/451 |
| 2002/0174180 A1* | 11/2002 | Brown | G06F 16/1787 |
| | | | 709/203 |
| 2004/0022390 A1* | 2/2004 | McDonald | H04L 9/3234 |
| | | | 380/277 |
| 2007/0277231 A1* | 11/2007 | Medvinsky | H04L 9/3273 |
| | | | 726/5 |
| 2008/0189778 A1* | 8/2008 | Rowley | H04L 63/0823 |
| | | | 726/9 |
| 2011/0302415 A1* | 12/2011 | Ahmad | H04L 9/0825 |
| | | | 713/168 |
| 2014/0196104 A1* | 7/2014 | Chari | H04L 63/20 |
| | | | 726/1 |
| 2015/0249540 A1* | 9/2015 | Khalil | H04L 9/3268 |
| | | | 713/158 |
| 2015/0304110 A1* | 10/2015 | Oberheide | H04L 63/12 |
| | | | 713/155 |
| 2015/0381621 A1* | 12/2015 | Innes | H04L 9/321 |
| | | | 726/7 |
| 2017/0302653 A1* | 10/2017 | Ortner | H04L 63/0435 |
| 2018/0101850 A1 | 4/2018 | Pisut, IV et al. | |
| 2020/0213116 A1* | 7/2020 | Fattal | H04W 12/06 |
| 2020/0280855 A1* | 9/2020 | Avetisov | G06F 21/45 |

OTHER PUBLICATIONS

Michitomo Morii et al., Research on Integrated Authentication Using Passwordless Authentication Method, Jul. 4-8, 2017, IEEE, pp. 682-685. (Year: 2017).*

Bo Zhu et al., A Solution to Password-less Universal Login, Jul. 8, 2014, IEEE, pp. 488-492. (Year: 2014).*

Kirit Sælensminde et al., A simple password less authentication system for web sites, Jul. 1, 2010, IEEE, pp. 132-137. (Year: 2010).*

Nick Mooney, "A WebAuthn Authenticator for Android leveraging hardware-backed key storage and biometric user verification", https://github.com/duo-labs/android-webauthn-authenticator, downloaded from the internet on Mar. 13, 2019, 5 pages.

* cited by examiner

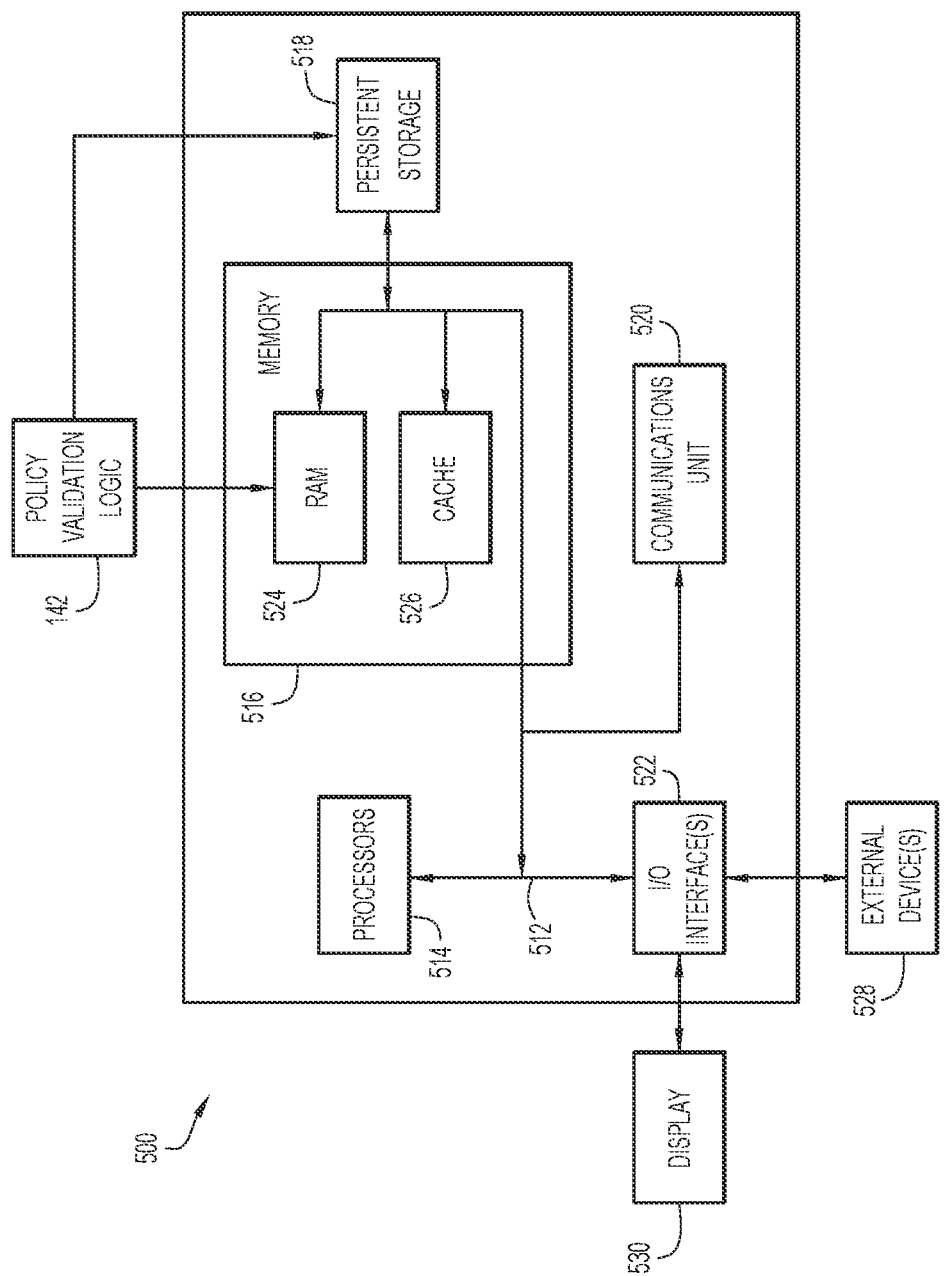

POLICY ENFORCEMENT AND INTROSPECTION ON AN AUTHENTICATION SYSTEM

TECHNICAL FIELD

The present disclosure relates to policy enforcement on interactions between computing devices.

BACKGROUND

Passwordless authentication systems allow users to securely log in to a publicly accessible servers by authenticating the user with a secure device instead of a remembered password. In one example, a passwordless authentication system allows a relying party (e.g., a web server) to request a credential from a client (e.g., a web browser). The credential request is passed to an authenticator (e.g., a secure element on a device held by the user), which prompts the user to accept or deny the login attempt. The authenticator may be a secure software application running in a secure environment on a user device, an external hardware element with security functionality attached to the user device, or an internal hardware element that is integrated with the user device.

Role-based policies may be used to determine who can access which applications based on the authenticated role of the individual or group. Specific individuals or groups may be allowed to access specific applications or data based on properly authenticating into the role. Policy enforcement is generally performed by the relying parties, such as websites, leaving organizations little ability to set policies that apply to web properties that the organizations do not control.

BRIEF DESCRIPTION OF THE DRAWINGS

FIG. 5 illustrates a simplified block diagram of a device that may be configured to perform methods presented herein, according to an example embodiment.

DESCRIPTION OF EXAMPLE EMBODIMENTS

Overview

Figure 1:
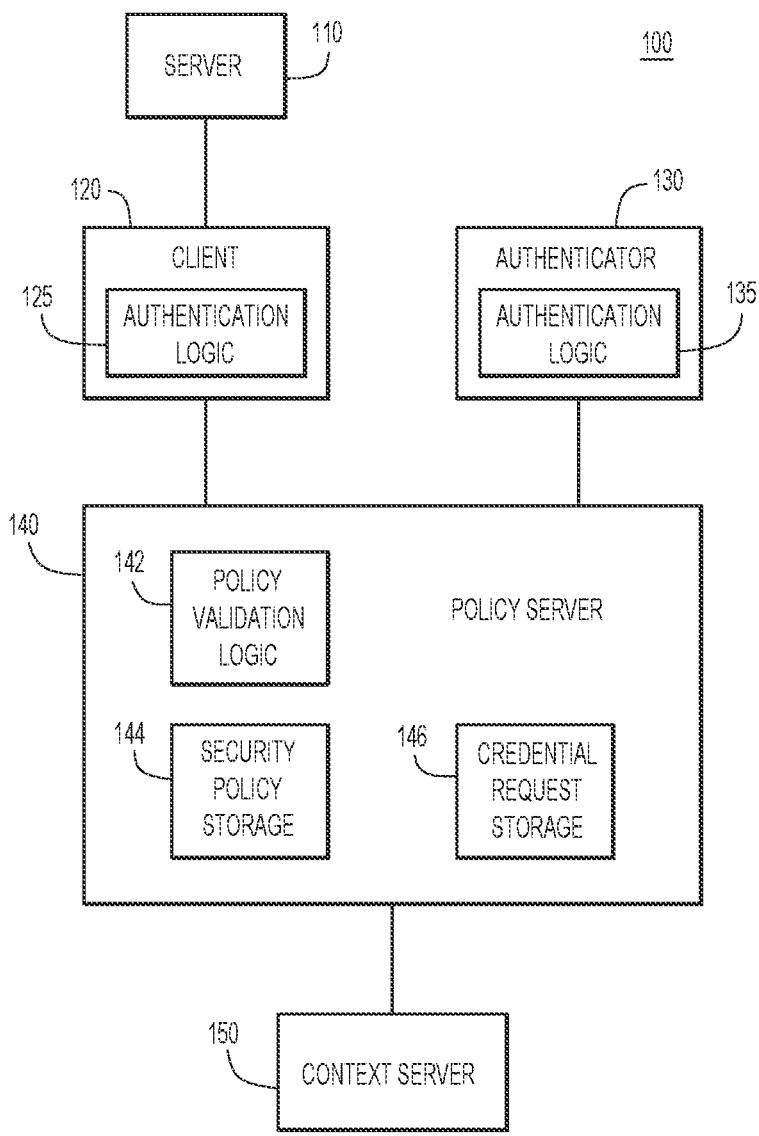
FIG. 1 is a simplified block diagram of a policy and introspection system configured to allow organizations to apply security policies on user access to external applications, according to an example embodiment.

A method is provided for handling authentication requests to apply introspection and policy enforcement. The method includes obtaining a client security policy and an authenticator security policy. The method also includes obtaining an encrypted credential request with client metadata from a client and determining whether the client metadata satisfies the client security policy. The method further includes providing the encrypted credential request to an authenticator device and obtaining an encrypted credential response with authenticator metadata from the authenticator device. The method also includes determining whether the authenticator metadata satisfies the authenticator security policy. The method further includes processing the encrypted credential response, without decrypting the encrypted credential request or the encrypted credential response, based on a determination of whether the client metadata satisfies the client security policy and the authenticator metadata satisfies the authenticator security policy.

EXAMPLE EMBODIMENTS

To use a passwordless authentication system, a public server (e.g., a web server) enrolls users with a username and relies on an authenticator (e.g., an application on a mobile device of the user) to confirm the identity of any client device that logs in with that username. The WebAuthn standard is used throughout the remainder of this application as one example of a passwordless authentication, but other authentication standards may also benefit from the techniques described herein.

In the WebAuthn standard, a relying party (e.g., a web server) communicates with an authenticator (e.g., a mobile hardware device, an application on a user's mobile device, a hardware device attached that attaches to a user device, etc.) through a client (e.g., a web browser on a user's computing device). The relying party registers a user the first time by sending a registration request to the client, and receiving a response that is signed by the authenticator. Subsequently, when the relying party logs in the registered user, the relying party sends a login request and receives a login response that is signed by the same authenticator. While the message flow of the registration exchange and the login exchange is the same, the content of the messages in each exchange is different.

In one example of the techniques described herein, a browser extension may intercept WebAuthn requests. A policy and introspection application on a policy server facilitates message passing and performs policy enforcement. A mobile application/authenticator performs user verification and cryptographically authenticates the user identity to a relying party. The techniques presented herein illustrate how a relying party (e.g., a website creating or logging in a user with WebAuthn) sends a request to a browser. The request is intercepted by a browser extension and sent the request to the policy, routing, and introspection application before being handled by the mobile application/authenticator.

Referring now to FIG. 1, an authentication system 100 is configured to authenticate users while providing policy enforcement on communication between a client and server. The system 100 includes a server 110 communicating with a client 120 to register a user. The client 120 includes authentication logic 125 configured to obtain an authenticated response from an authenticator 130. The authenticator 130 includes authentication logic 135 configured to process credential requests and provide authenticated responses to the requests.

A policy server 140 is configured to provide introspection and policy enforcement on the credential authentication process between the client 120 and the authenticator 130. The policy server 140 includes policy validation logic that compares metadata from both the client 120 and the authenticator 130 against security policies stored in security policy storage 144. Additionally, the policy server 140 may include a credential request storage 146 that stores records for each credential request (e.g., to provide an audit trail). Additionally, the policy server 140 may obtain additional context metadata from a context server 150 that is not directly involved in the credential authentication exchange.

In one example, the server 110 is a web server with a website that customizes content according to an authenticated username. The client 120 may be a browser on a user's computing device (e.g., laptop computer, desktop computer, virtual machine, mobile device, etc.). The authenticator 130 may be a hardware device (e.g., a dedicated security device) or software (e.g., an application) on a user's device (e.g., a mobile telephone). The web server 110 sends a credential request (e.g., a WebAuthn registration/login request) to the client 120. The client 120 responds with a credential response (e.g., a WebAuthn registration login response) that is signed by the authenticator 130.

In another example, the authentication logic 125 may include a browser extension that redirects the credential request to the policy server 140. The browser extension encrypts the credential request with cryptographic material that is not available to the policy server 140 and sends the encrypted credential request along with predetermined metadata. The client metadata may include information about the client 120 (e.g., physical location of client 120, operating system version, application/browser version, etc.), as well as information about the credential request (e.g., identity of server 110 making the credential request, time stamp of the request, etc.). The authentication logic 125 may be configured to determine the type of information to include in the client metadata according to the information in the security policies. The browser extension pairs with the authentication logic 135 on the authenticator through a process that ensures cryptographic security between the client 120 and the authenticator 130.

The authentication logic 135 is configured to decrypt the credential request, and process the request to authenticate the username in the credential request. In one example, the authentication logic 135 may be configured to automatically validate the username and generate a signed credential response. Alternatively, the authentication logic 135 may be configured to prompt the user to validate their identity (e.g., via a personal identification number (PIN) or via biometric identification (e.g., a fingerprint, iris/retina scan, facial identity, etc.) before generating the signed credential response. The authentication logic 135 receives and responds to requests to create or release credentials to the client 120 via the authentication logic 125, and performs cryptographic operations (e.g., using hardware security features) to ensure the safety of private credential material.

Along with the signed credential, the authentication logic 135 provides authenticator metadata to the policy server 140. The authenticator metadata may include information about the authenticator 130 (e.g., physical location of authenticator 130, application/operating system version, time stamp of authentication request, etc.). The policy server 140 passes the encrypted credential request and responses between the client 120 and the authenticator 130, while applying policy enforcement and introspection based on the metadata attached to the encrypted payload.

The policy validation logic 142 in the policy server 140 may be configured to compare client metadata from the authentication logic 125 and/or authenticator metadata from the authentication logic 135 against a predetermined value in a security policy. For instance, the policy validation logic 142 may compare the browser version of the client 120 against a minimum standard in the client security policy to ensure that the client browser is not outdated/potentially vulnerable. Similarly, the policy validation logic 142 may compare the operating system of the mobile device that the authenticator 130 is running against a minimum standard in the authenticator security policy.

In another example, the policy validation logic 142 may compare client metadata provided by the authentication logic 125 with authenticator metadata provided by the authentication logic 135 to determine consistency between the two devices. For instance, a security policy may require that the physical location of the client 120 and the authenticator 130 be within a predefined distance (e.g., close enough that a single user is in possession of both devices). Additionally, the security policy may require that the time stamp from the authenticator metadata be within a certain range of the time stamp of the client metadata (e.g., from 0.1 milliseconds to 1 minute) to ensure that the response is valid for that particular request.

In a further example, the context server 150 may be an external system that provides context on the user (e.g., a door badging system, a scheduling/calendar system, etc.), which may corroborate or preclude authentication of the username. For instance, if the client 120 device and the authenticator 130 both provide metadata placing the physical location of the devices within the predefined distance, but a badge worn by the authorized user associated with the client 120/authenticator 130 was recently scanned at a location other than the location provided by the client/authenticator metadata, then the policy server 140 may reject the authenticated credential response.

Figure 2:
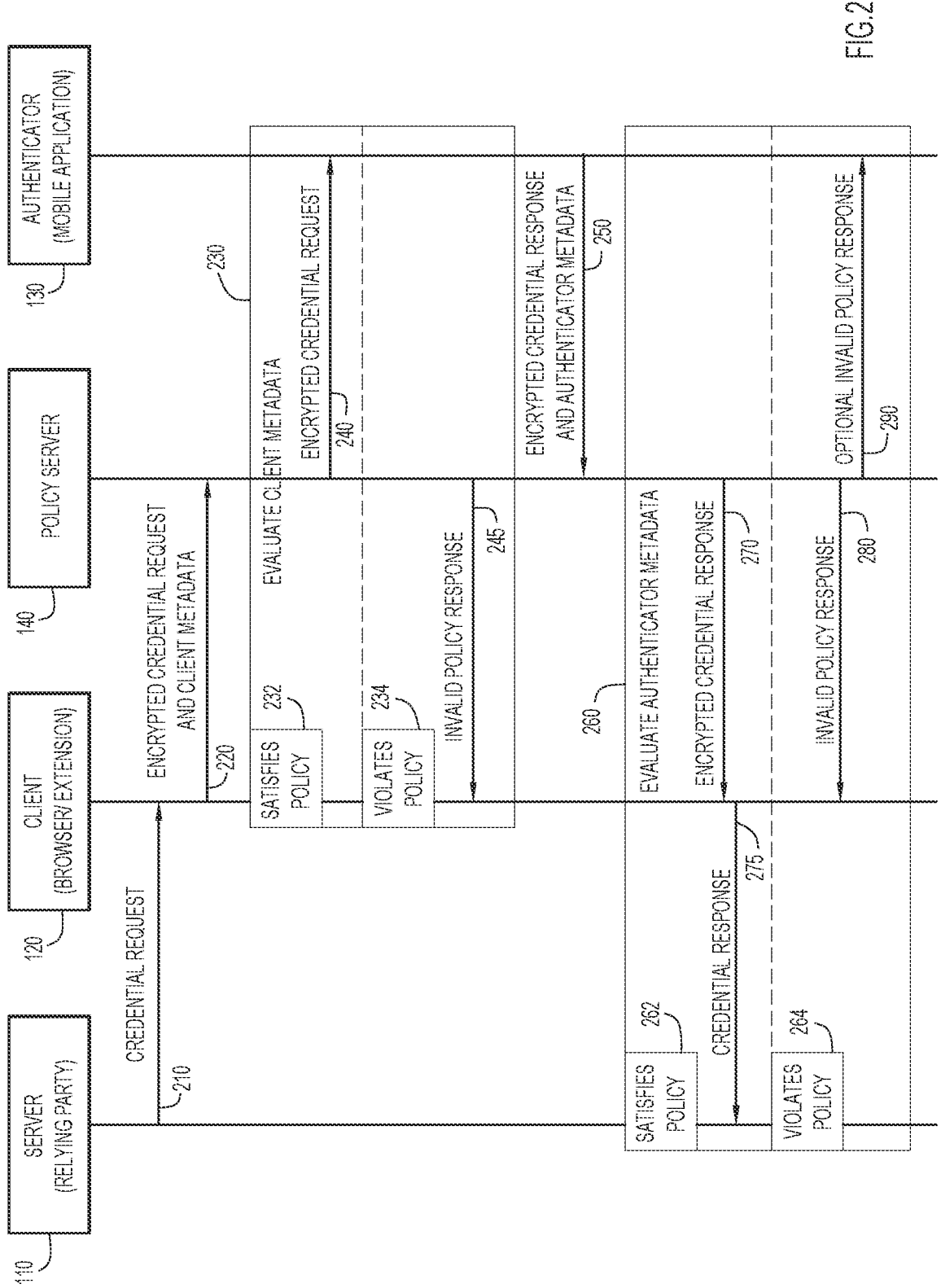
FIG. 2 is a message flow diagram illustrating a passwordless authentication procedure, according to an example embodiment.

Referring now to FIG. 2, a sequence diagram illustrates how a relying party (e.g., a website) sends a request to a client browser to authenticate a user. The server 110 (i.e., the relying party) sends a credential request 210 to the client 120. In one example, the credential request 210 may be a WebAuthn registration request or a WebAuthn login request. The client 120 encrypts the credential request 210 and combines the encrypted credential request with client metadata into a message 220. In one example, a browser extension overrides the typical WebAuthn Application Programming Interface (API) on the client 120 to send the message 220 to the policy server 140. In another example, the credential request 210 is encrypted and the client metadata is unencrypted in the message 220. Alternatively, the credential request may be encrypted with cryptographic material unavailable to the policy server 140, while the client metadata is encrypted with cryptographic material shared with the policy server 140. In other words, the policy server 140 is able to access the client metadata, but not the credential request.

The policy server 140 receives the encrypted credential request and client metadata in the message 220 and evaluates the client metadata against one or more security policies at 230 to determine whether the client metadata satisfies the security policy at 232 or violates the security policy at 234. If the client metadata satisfies the client security policy at 232, then the policy server 140 forwards the encrypted credential request 240 to the authenticator 130 (e.g., a mobile application on the user's mobile device). If the client metadata violates the client security policy at 234, then the policy server 140 drops the encrypted credential request and sends an invalid policy response 245 to the client 120. In one example, the invalid policy response 245 may include a reason the client metadata violates the security policy (e.g., the browser is out of date) and may suggest corrective actions (e.g., update the browser software).

In another example, the policy server 140 may generate and store a record of the credential request along with some or all of the client metadata. The stored records of credential requests may be used to generate an audit trail in the event that an improper authentication exchange is subsequently determined.

After the client 120 corrects any security policy violations, and an encrypted credential request 240 is received at the authenticator 130, the authenticator 130 decrypts the credential request and processes the request. In one example, the authenticator 130 may generate or release a WebAuthn credential based on the WebAuthn request sent by the server 110. In another example, the authenticator 130 may require the user to provide another factor of identification (e.g., a PIN or biometric data) before generating the credential response. The authenticator 130 encrypts the credential response and send the encrypted credential response and authenticator metadata in a message 250 to the policy server 140. In a further example, the credential response is encrypted and the authenticator metadata is unencrypted in the message 250. Alternatively, the credential response may be encrypted with cryptographic material unavailable to the policy server 140, while the authenticator metadata is encrypted with cryptographic material shared with the policy server 140. In other words, the policy server 140 is able to access the authenticator metadata, but not the credential response.

After receiving the message 250 with the encrypted credential response and the authenticator metadata, the policy server 140 evaluates the authenticator metadata against one or more security policies (e.g., an authenticator policy) at 260 to determine whether the authenticator metadata satisfies the security policy at 262 or violates the policy at 264. In one example, the policy server 140 may compare the authenticator metadata to the client data to determine if the difference satisfies a security policy. Additionally, the policy server 140 may obtain additional context metadata from another computing device (e.g., a door badging system or calendar system) to provide additional information that may be used to evaluate whether the authenticator metadata and/or the client metadata satisfies or violates one or more security policies.

If the policy server 140 determines that the authenticator metadata, as well as any additional context metadata satisfies the security policy at 262, then the policy server 140 forwards the encrypted credential response 270 to the client 120. The client 120 decrypts the encrypted credential response 270 to generate a credential response 275, which the client 120 sends to the server 110. In one example, the credential request 210 and the credential response 275 between the server 110 and the client 120 may be encrypted with cryptographic material shared between the server 110 and the client 120.

If the policy server 140 determines that the authenticator metadata, or any additional context metadata violates the security policy at 264, then the policy server 140 drops the encrypted credential response and sends an invalid policy response 280 to the client 120. The policy server 140 may optionally send an invalid policy response 290 to the authenticator 130. For instance, the authenticator 130 may be an outdated version, which would allow the authenticator 130 to correct the security policy violation by updating the software of the authenticator 130.

Figure 3:
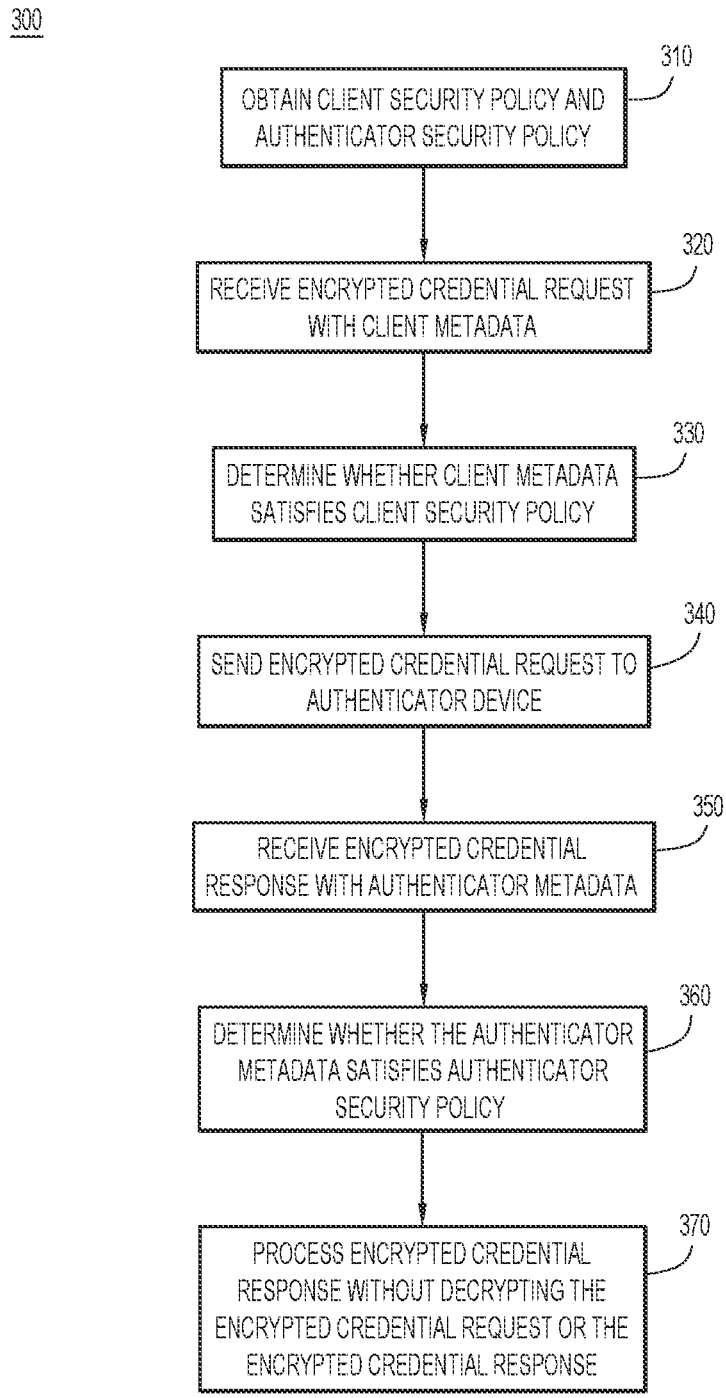
FIG. 3 is a flowchart illustrating operations of a policy server for enforcing security policies on credential requests, according to an example embodiment.

Referring now to FIG. 3, a flowchart illustrates operations performed at a policy server (e.g., policy server 140) in a process 300 to provide introspection and policy enforcement on user authentication exchanges, such as WebAuthn exchanges. At 310, the policy server obtains one or more security policies, including a client security policy and an authenticator security policy. In one example, the security policies may be configured to provide visibility into user authentications by organizations associated with the user (e.g., an employer of the user). At 320, the policy server receives an encrypted credential request from a client, along with client metadata. In one example, the client metadata may include an indication of the source of the credential request (e.g., the address of the website requesting the credential), indications of software version on the client, a physical location of the client, and/or a time stamp for the credential request.

At 330, the policy server determines whether the client metadata satisfies or violates the client security policy. In one example, the policy server may compare the client metadata (e.g., software version) against a predefined minimum standard in the client security policy. In another example, the policy server may determine that the client metadata violates a security policy, and notify the client of corrective actions that are needed before the authentication will be allowed to proceed. At 340, the policy server sends the encrypted credential request to an authenticator device. In one example, the authenticator device may be a mobile device registered to the user of the client. In response to the encrypted credential request sent at 340, the policy server receives an encrypted credential response and authenticator metadata at 350. In one example, the authenticator metadata may include a physical location of the authenticator device, indications of software versions of applications/operating systems running on the authenticator device, and/or a time stamp for the credential response.

At 360, the policy server determines whether the authenticator metadata satisfies or violates the authenticator security policy. In one example, the policy server may compare the authenticator metadata against predefined standards in the authenticator security policy. Additionally, the policy server may compare authenticator metadata to client metadata to determine whether the authenticator satisfies or violates the authenticator security policy (e.g., to determine whether the physical locations of the client and the authenticator are compatible). Further, the policy server may obtain additional context metadata from an external computing device (e.g., as part of an entry badging system) that is not directly involved with the authentication exchange. The policy server may compare the additional context metadata against the client metadata and/or the authenticator metadata to determine whether any of the security policies are violated (e.g., if the physical location or time stamp of the client and/or authenticator are incompatible with a physical location or time stamp of the user's logged entry through the badging system).

Once the policy server has determined whether the client metadata and the authenticator metadata satisfy the client security policy and the authenticator security policy, the policy server processes the encrypted credential response at 370 without decrypting the encrypted credential request or the encrypted credential response. In one example, the policy server may process the encrypted credential response by sending the encrypted credential response to the client based on a determination that none of the metadata violates any security policy. Alternatively, based on a determination that at least some of the metadata violates a security policy, the policy server may notify the client and/or the authenticator of the policy violation. In a further example, the policy server may instruct the client or the authenticator to take additional action (e.g., erasing at least some portion of the memory) based on a determination that the metadata violates a security policy.

Figure 4:
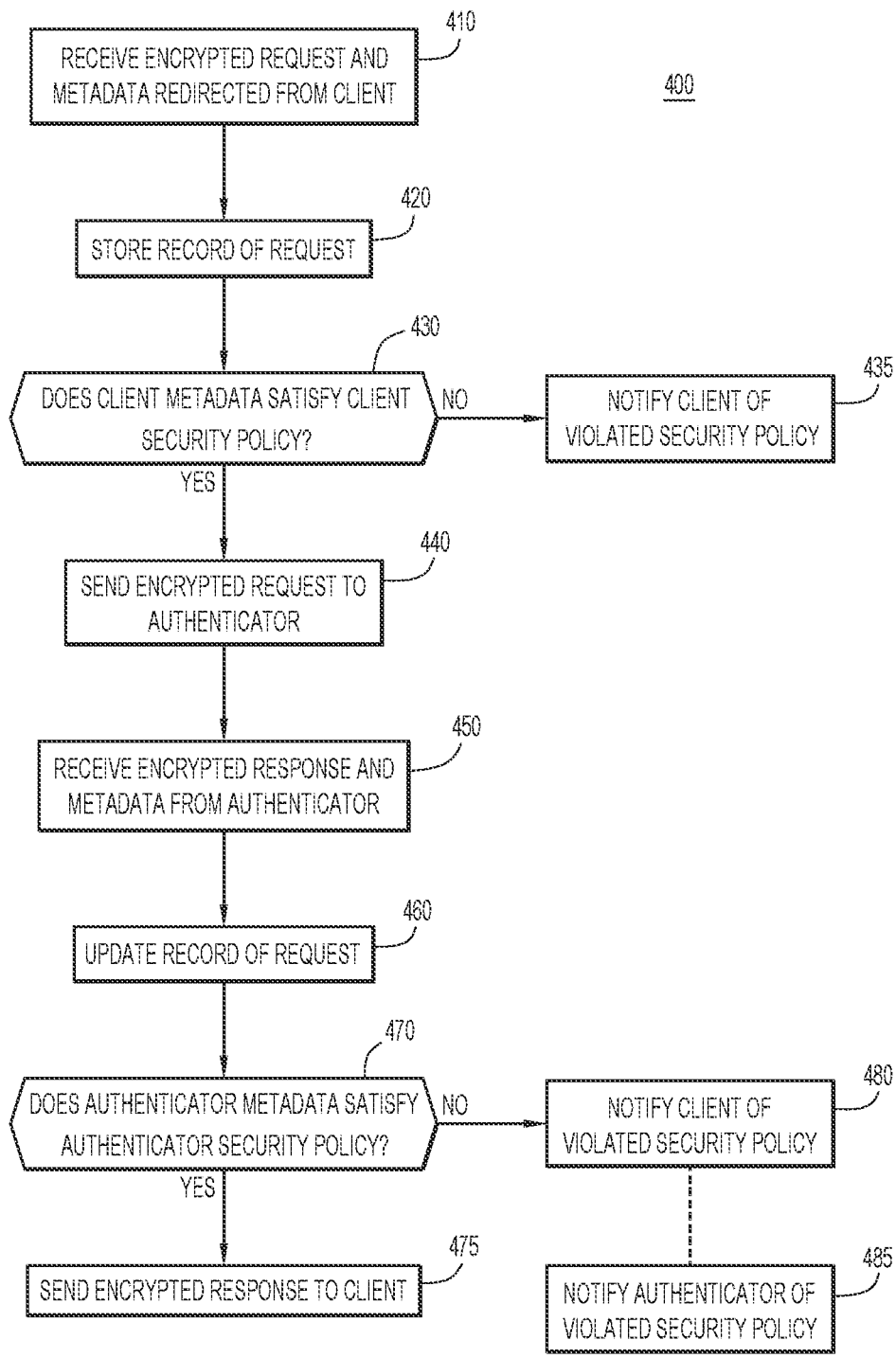
FIG. 4 is a flowchart illustrating operations of a policy server for handling and recording credential requests according to security policies, according to an example embodiment.

Referring now to FIG. 4, a flowchart illustrates operations performed at a policy server (e.g., policy server 140) in a process 400 to provide organizational policy control over a user authentication exchange. At 410, the policy server receives an encrypted request from a client, along with client metadata. In one example, the request may be a WebAuthn credential request (e.g., registration or login), and the client metadata may include the identity of the relying party, information from the client device (e.g., software versions, physical location), or timing information related to the request. In another example, the encrypted request may be redirected by software on the client (e.g., a browser extension) from an authenticator to the policy server. At 420, the policy server stores a record of the user authentication exchange, which may include some or all of the client metadata.

At 430, the policy server determines whether the client metadata satisfies the client security policy. If the client metadata violates the client security policy, then the policy server notifies the client of the violated security policy at 435. In one example, the policy server may provide information on corrective actions that the client may take to satisfy the client security policy. If the client metadata satisfies the client security policy, then the policy server sends the encrypted request, without decrypting the request, to the authenticator at 440.

In response to sending the encrypted request, at 450 the policy server receives an encrypted response from the authenticator, along with authenticator metadata. In one example, the response may be a WebAuthn credential response signed by the authenticator. In another example, the authenticator metadata may include information from the authenticator device (e.g., software versions, physical location), or timing information related to the response. At 460, the policy server may update the record of the user authentication exchange, e.g., with some or all of the authenticator metadata.

At 470, the policy server determines whether the authenticator metadata satisfies the authenticator security policy. In one example, the authenticator security policy may also reference client metadata and/or other additional context metadata to determine whether the authenticator metadata violates the authenticator security policy. For instance, the authenticator security policy may be configured to require that the time stamps of the request and the response be within a specified time frame. Additionally, the authenticator security policy may be configured to determine whether the physical location of the client and authenticator are compatible with the additional context metadata (e.g., the location of a badged entry system where the user was recently located). If the policy server determines that the authenticator metadata satisfies the authenticator security policy, then the policy server sends the encrypted response, without decrypting the response, to the client at 475.

If the policy server determines that the authenticator metadata violates the authenticator security policy at 470, then the policy server notifies the client of a violated security policy at 480. Optionally, the policy server may notify the authenticator of the violated security policy at 485. Additionally, the policy server may direct the client and/or authenticator to take further actions (e.g., updating software, locking compromised client/authenticator devices, erasing software from compromised client/authenticator devices) in response to a violated security policy.

Referring now to FIG. 5, a hardware block diagram illustrates a computing device 500 that may perform the functions of any of the servers or computing or control entities referred to herein in connection with the authentication system described herein. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the policy validation logic 142 may be stored in memory 516 or persistent storage 518 for execution by processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer usable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein shift policy enforcement away from a website, and apply policy enforcement at an authenticator level. Policy is applied around a request for a credential and credential requests for any website may be stored as it goes through the policy, introspection, and routing application. This gives organizations insight into user endpoints that may not be easily available without the techniques described herein. The techniques feature end-to-end encryption between a user client and an authenticator device with configurable metadata submission, allowing different levels of policy to be applied to the metadata.

By routing authentication requests through an intermediary service, the techniques presented herein allow organizations and users to apply policy to authentication requests at the client-to-authenticator level. This allows policy application to services that may not be controlled by the organization or user, as well as providing organizational visibility into authentication attempts to various services. End-to-end encryption and configurable metadata submission ensures user privacy while maintaining organizational visibility.

In one form, a method is provided for handling authentication requests to apply introspection and policy enforcement. The method includes obtaining a client security policy and an authenticator security policy. The method also includes obtaining an encrypted credential request with client metadata from a client and determining whether the client metadata satisfies the client security policy. The method further includes providing the encrypted credential request to an authenticator device and obtaining an encrypted credential response with authenticator metadata from the authenticator device. The method also includes determining whether the authenticator metadata satisfies the authenticator security policy. The method further includes processing the encrypted credential response, without decrypting the encrypted credential request or the encrypted credential response, based on a determination of whether the client metadata satisfies the client security policy and the authenticator metadata satisfies the authenticator security policy.

Additionally, the method may include storing a record of the encrypted credential request. The record may include at least a portion of the client metadata and/or at least a portion of the authenticator metadata. Further, the method may include providing the encrypted credential response to the client based on a determination that the client metadata satisfies the client security policy and the authenticator metadata satisfies the authenticator security policy. Alternatively, the method may include providing a first failure message to the client and/or the authenticator device based on a determination that the client metadata violates the client security policy or the authenticator metadata violates the authenticator security policy. Additionally, the method may include obtaining additional metadata from another computing device and determining whether the additional metadata violates either the client security policy or the authenticator security policy. The method may include processing the encrypted credential response based on a determination of whether any of the client metadata, the authenticator metadata, or the additional metadata violates either the client security policy or the authenticator security policy.

In another form, an apparatus comprising a network interface and a processor is provided. The network interface is configured to communicate with a client and an authenticator device across one or more computer networks. The processor is configured to obtain a client security policy and an authenticator security policy. The processor is also configured to obtain from the client via the network interface, an encrypted credential request with client metadata. The processor is further configured to determine whether the client metadata satisfies the client security policy, and cause the network interface to provide the encrypted credential request to the authenticator device. The processor is configured to obtain from the authenticator device via the network interface, an encrypted credential response with authenticator metadata. The processor is also configured to determine whether the authenticator metadata satisfies the authenticator security policy. The processor is further configured to process the encrypted credential response, without decrypting the encrypted credential request or the encrypted credential response, based on a determination of whether the client metadata satisfies the client security policy and the authenticator metadata satisfies the authenticator security policy.

In yet another form, a non-transitory computer readable storage media is provided that is encoded with instructions that, when executed by a processor of a policy server, cause the processor to obtain a client security policy and an authenticator security policy. The instructions also cause the process to obtain an encrypted credential request with client metadata from a client and determine whether the client metadata satisfies the client security policy. The instructions further cause the processor to provide the encrypted credential request to an authenticator device and obtain an encrypted credential response with authenticator metadata from the authenticator device. The instructions cause the processor to determine whether the authenticator metadata satisfies the authenticator security policy. The instructions also cause the processor to process the encrypted credential response, without decrypting the encrypted credential request or the encrypted credential response, based on a determination of whether the client metadata satisfies the client security policy and the authenticator metadata satisfies the authenticator security policy.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a policy server, obtaining a client security policy and an authenticator security policy;
obtaining an encrypted passwordless credential request with client metadata from a client;
determining whether the client metadata satisfies the client security policy;
providing the encrypted passwordless credential request to an authenticator device;
obtaining an encrypted passwordless credential response with authenticator metadata from the authenticator device;
determining whether the authenticator metadata satisfies the authenticator security policy;
obtaining additional metadata from an external computing device, the additional metadata providing context for a user of the client or a user of the authenticator device;
determining whether the additional metadata violates either the client security policy of the authenticator security policy; and
processing the encrypted passwordless credential response, without decrypting the encrypted passwordless credential request or the encrypted passwordless credential response, based on a determination of whether any of the client metadata, the authenticator metadata, or the additional metadata violates either the client security policy or the authenticator security policy.

2. The method of claim 1, further comprising storing a record of the encrypted passwordless credential request, the record including at least a portion of the client metadata.

3. The method of claim 2, further comprising storing at least a portion of the authenticator metadata in the record.

4. The method of claim 1, further comprising, responsive to a determination that the client metadata satisfies the client security policy and the authenticator metadata satisfies the authenticator security policy, providing the encrypted passwordless credential response to the client.

5. The method of claim 1, further comprising, responsive to a determination that the client metadata violates the client security policy or the authenticator metadata violates the authenticator security policy, providing a first failure message to the client.

6. The method of claim 5, further comprising providing a second failure message to the authenticator device.

7. The method of claim 1, wherein the authenticator security policy includes a comparison of the client metadata to the authenticator metadata.

8. An apparatus comprising:
a network interface configured to communicate with a client and an authenticator device across one or more computer networks; and
a hardware processor configured to:
obtain a client security policy and an authenticator security policy;
obtain from the client via the network interface, an encrypted passwordless credential request with client metadata;
determine whether the client metadata satisfies the client security policy;
cause the network interface to provide the encrypted passwordless credential request to the authenticator device;
obtain from the authenticator device via the network interface, an encrypted passwordless credential response with authenticator metadata;
determine whether the authenticator metadata satisfies the authenticator security policy;
obtain additional metadata from an external computing device, the additional metadata providing context for a user of the client or a user of the authenticator device;
determine whether the additional metadata violates either the client security policy of the authenticator security policy; and
process the encrypted passwordless credential response, without decrypting the encrypted passwordless credential request or the encrypted passwordless credential response, based on a determination of whether any of the client metadata, the authenticator metadata, or the additional metadata violates either the client security policy or the authenticator security policy.

9. The apparatus of claim 8, wherein the hardware processor is further configured to store a record of the encrypted passwordless credential request, the record including at least a portion of the client metadata or at least a portion of the authenticator metadata.

10. The apparatus of claim 8, wherein the hardware processor is further configured to, responsive to a determination that the client metadata satisfies the client security policy and the authenticator metadata satisfies the authenticator security policy, cause the network interface to provide the encrypted passwordless credential response to the client.

11. The apparatus of claim 8, wherein the hardware processor is further configured to, responsive to a determination that the client metadata violates the client security policy or the authenticator metadata violates the authenticator security policy, cause the network interface to provide a first failure message to the client.

12. The apparatus of claim 11, wherein the hardware processor is further configured to cause the network interface to provide a second failure message to the authenticator device.

13. One or more non-transitory computer readable storage media encoded with instructions that, when executed by a processor of a policy server, cause the processor to:
obtain a client security policy and an authenticator security policy;
obtain an encrypted passwordless credential request with client metadata from a client;
determine whether the client metadata satisfies the client security policy;
provide the encrypted passwordless credential request to an authenticator device;
obtain an encrypted passwordless credential response with authenticator metadata from the authenticator device;
determine whether the authenticator metadata satisfies the authenticator security policy;
obtain additional metadata from an external computing device, the additional metadata providing context for a user of the client or a user of the authenticator device;
determine whether the additional metadata violates either the client security policy of the authenticator security policy; and
process the encrypted passwordless credential response, without decrypting the encrypted passwordless credential request or the encrypted passwordless credential response, based on a determination of whether any of the client metadata, the authenticator metadata, or the additional metadata violates either the client security policy or the authenticator security policy.

14. The non-transitory computer readable storage media of claim 13, further comprising instructions operable to cause the processor to store a record of the encrypted passwordless credential request, the record including at least a portion of the client metadata or at least a portion of the authenticator metadata.

15. The non-transitory computer readable storage media of claim 13, further comprising instructions operable to cause the processor to, responsive to a determination that the client metadata satisfies the client security policy and the authenticator metadata satisfies the authenticator security policy, provide the encrypted passwordless credential response to the client.

16. The non-transitory computer readable storage media of claim 13, further comprising instructions operable to cause the processor to, responsive to a determination that the client metadata violates the client security policy or the authenticator metadata violates the authenticator security policy, provide a first failure message to the client.

17. The non-transitory computer readable storage media of claim 16, further comprising instructions operable to cause the processor to provide a second failure message to the authenticator device.

* * * * *